(12) United States Patent
Truong et al.

(10) Patent No.: US 11,948,490 B2
(45) Date of Patent: Apr. 2, 2024

(54) INFORMATION PROCESSING APPARATUS AND CONTROL METHOD

(71) Applicant: Lenovo (Singapore) Pte. Ltd., Singapore (SG)

(72) Inventors: Huy Ngoc Truong, Kanagawa (JP); Kazuo Fujii, Kanagawa (JP); Limin Xiao, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/341,757

(22) Filed: Jun. 26, 2023

(65) Prior Publication Data
US 2024/0021126 A1    Jan. 18, 2024

(30) Foreign Application Priority Data
Jul. 12, 2022    (JP) .................................. 2022-111719

(51) Int. Cl.
*G09G 3/20*    (2006.01)
(52) U.S. Cl.
CPC ....... *G09G 3/20* (2013.01); *G09G 2320/0686* (2013.01); *G09G 2354/00* (2013.01)
(58) Field of Classification Search
CPC ............. G09G 3/20; G09G 2320/0686; G09G 2354/00
See application file for complete search history.

(56) References Cited

U.S. PATENT DOCUMENTS

| | | | |
|---|---|---|---|
| 2013/0065614 A1 | 3/2013 | Jung | |
| 2017/0123454 A1 | 5/2017 | Evans, V et al. | |
| 2018/0316835 A1 | 11/2018 | Files et al. | |
| 2018/0357952 A1 | 12/2018 | Yang | |
| 2019/0311512 A1* | 10/2019 | VanBlon | G02B 27/0179 |
| 2019/0311663 A1* | 10/2019 | Zhao | G09G 3/006 |
| 2019/0311666 A1* | 10/2019 | Chen | G01S 7/4816 |
| 2019/0311668 A1* | 10/2019 | Marchya | G09G 3/2096 |
| 2019/0311669 A1* | 10/2019 | Zhu | G09G 3/2092 |
| 2019/0311680 A1* | 10/2019 | Koo | G09G 3/3266 |
| 2019/0311693 A1* | 10/2019 | Saka | G01C 21/36 |
| 2020/0350377 A1 | 11/2020 | Zhong et al. | |
| 2022/0116546 A1 | 4/2022 | Gummadi et al. | |

FOREIGN PATENT DOCUMENTS

| | | |
|---|---|---|
| CN | 110730298 A | 1/2020 |
| JP | 2004056297 A | 2/2004 |
| JP | 2013205543 A | 10/2013 |
| JP | 2018067915 A | 4/2018 |
| JP | 2021-529411 A | 10/2021 |
| WO | 2021256316 A1 | 12/2021 |

\* cited by examiner

*Primary Examiner* — Sejoon Ahn
(74) *Attorney, Agent, or Firm* — Osha Bergman Watanabe & Burton LLP

(57) ABSTRACT

The information processing apparatus includes a display having a screen area with an array of a plurality of pixels and a camera near the rear face of the display to capture an image based on light incident through the display. The information processing apparatus stops emission of light from pixels in a first area corresponding to a position in the screen area of the display where the camera is placed and control the pixels to be non-displayed, and when the operation position within the screen area of the display is within the first area, displays an image based on the display data corresponding to the first area in any part of the screen area of the display.

13 Claims, 14 Drawing Sheets

INFORMATION PROCESSING APPARATUS AND CONTROL METHOD

CROSS-REFERENCE TO RELATED APPLICATIONS

This application claims priority to Japanese Patent Application No. 2022-111719 filed on Jul. 12, 2022, the contents of which are hereby incorporated herein by reference in their entirety.

BACKGROUND OF THE INVENTION

Field of the Invention

The present invention relates to an information processing apparatus and a control method.

Description of the Related Art

In recent years, camera-under-display (or under-display camera) techniques have been used in smartphones and other devices, where the camera (e.g., front camera) is placed near the rear face of (under) the display. For instance, Japanese Translation of PCT International Application Publication No. 2021-529411 discloses the display having pixels with organic light emitting diodes (OLEDs), each including components (e.g., electrodes) made of a light-transmitting material, thus collecting the light transmitting through a screen area of the display to the camera located below the display. The technique of placing the camera near the rear face of (under) the display suppresses an increase in size of the device when increasing the screen size of the display.

When capturing an image of light passing through the screen area of the display with a camera near the rear face of the display, the captured image may be affected if pixels in the portion of the screen area corresponding to the angle of view of the camera (hereinafter referred to as "camera area") are emitting light. To improve the image capture quality, a method is conceivable to stop light emission at least from the pixels in the camera area to control the pixels to be non-displayed (display off). However, when the user uses various contents displayed on the screen area, this method leads to undesirable situations due to the camera area that is not displayed. For example, if an operation button or text box is in the camera area that is not displayed, the user may make an operation error because some or all of the button or box is hidden.

SUMMARY OF THE INVENTION

One or more embodiments of the present invention provides an information processing apparatus and a control method, the apparatus having a configuration of capturing an image of light transmitting through the screen area of the display with a camera near the rear face of the display, and appropriately controlling the display.

An information processing apparatus according to the first aspect of the present invention includes: a display having a screen area with an array of a plurality of pixels; a camera near the rear face of the display to capture an image based on light incident through the display; a memory that temporarily stores display data to be displayed on the display; and a processor that controls light emission of a plurality of pixels of the display based on the display data stored in the memory, thus causing the display to display an image based on the display data. The processor is configured to perform: display stop process to stop emission of light from pixels in a first area corresponding to a position in the screen area of the display where the camera is placed and control the pixels to be non-displayed; operation position detection process to detect an operation position within the screen area of the display; and when the operation position detected by the operation position detection process is within the first area, display restoring process to display an image based on the display data corresponding to the first area in any part of the screen area of the display.

In the information processing apparatus, the processor may be configured to, in the display stop process, when the function of the camera runs, stop emission of light from the pixels in the first area and control the pixels to be non-displayed.

In the information processing apparatus, the processor may be configured to, in the display restoring process, when the operation position detected by the operation position detection process is within the first area, control emission of light from the pixels in the first area to display an image based on the display data corresponding to the first area.

In the information processing apparatus, the processor may be configured to, depending on the operating state of the camera, prohibit execution of the display restoring process.

In the information processing apparatus, the processor may be configured to, in the display restoring process, control emission of light from the pixels in the first area to display an image based on the display data corresponding the first area so as to display with a reduced amount of light emitted from the pixels in the first area, depending on the operating state of the camera.

In the information processing apparatus, the processor may be configured to permit or prohibit execution of the display restoring process according to user's instruction.

In the information processing apparatus, the processor may be configured to, in the display restoring process, when the operation position detected by the operation position detection process is within the first area, display an image based on the display data corresponding to the first area in an area other than the first area in the screen area of the display.

In the information processing apparatus, the processor may be configured to, in the display restoring process, display an image based on the display data corresponding to the first area in an area other than the first area in the screen area of the display while enlarging the image.

In the information processing apparatus, the processor may be configured to permit or prohibit execution of the display restoring process according to user's instruction.

In the information processing apparatus, the processor may be configured to, in the display restoring process, when the operation position detected by the operation position detection process is within the first area, selectively switch between a first display restoring process, which displays an image based on the display data corresponding to the first area while controlling light emission of pixels in the first area, and a second display restoring process, which displays an image based on the display data corresponding to the first area in an area of the screen area of the display other than the first area.

In the information processing apparatus, the processor may be configured to switch between the first and second display restoring processes according to the operating state of the camera.

In the information processing apparatus, the processor may be configured to switch between the first and second display restoring processes according to user's instruction.

A control method according to the second aspect of the present invention controls an information processing apparatus including: a display having a screen area with an array of a plurality of pixels; a camera near the rear face of the display to capture an image based on light incident through the display; a memory that temporarily stores display data to be displayed on the display; and a processor that controls light emission of a plurality of pixels of the display based on the display data stored in the memory, thus causing the display to display an image based on the display data. The processor stops emission of light from pixels in a first area corresponding to a position in the screen area of the display where the camera is placed and control the pixels to be non-displayed; detects an operation position within the screen area of the display; and when the operation position detected is within the first area, displays an image based on the display data corresponding to the first area in any part of the screen area of the display.

The above-described aspects of the present invention have a configuration of capturing an image of light transmitting through the screen area of the display with a camera near the rear face of the display, and appropriately control the display.

DETAILED DESCRIPTION OF THE INVENTION

The following describes several embodiments of the present invention, with reference to the attached drawings.

First Embodiment

Overview

Firstly, the overview of an information processing apparatus according to the first embodiment is described below.

Figure 1:
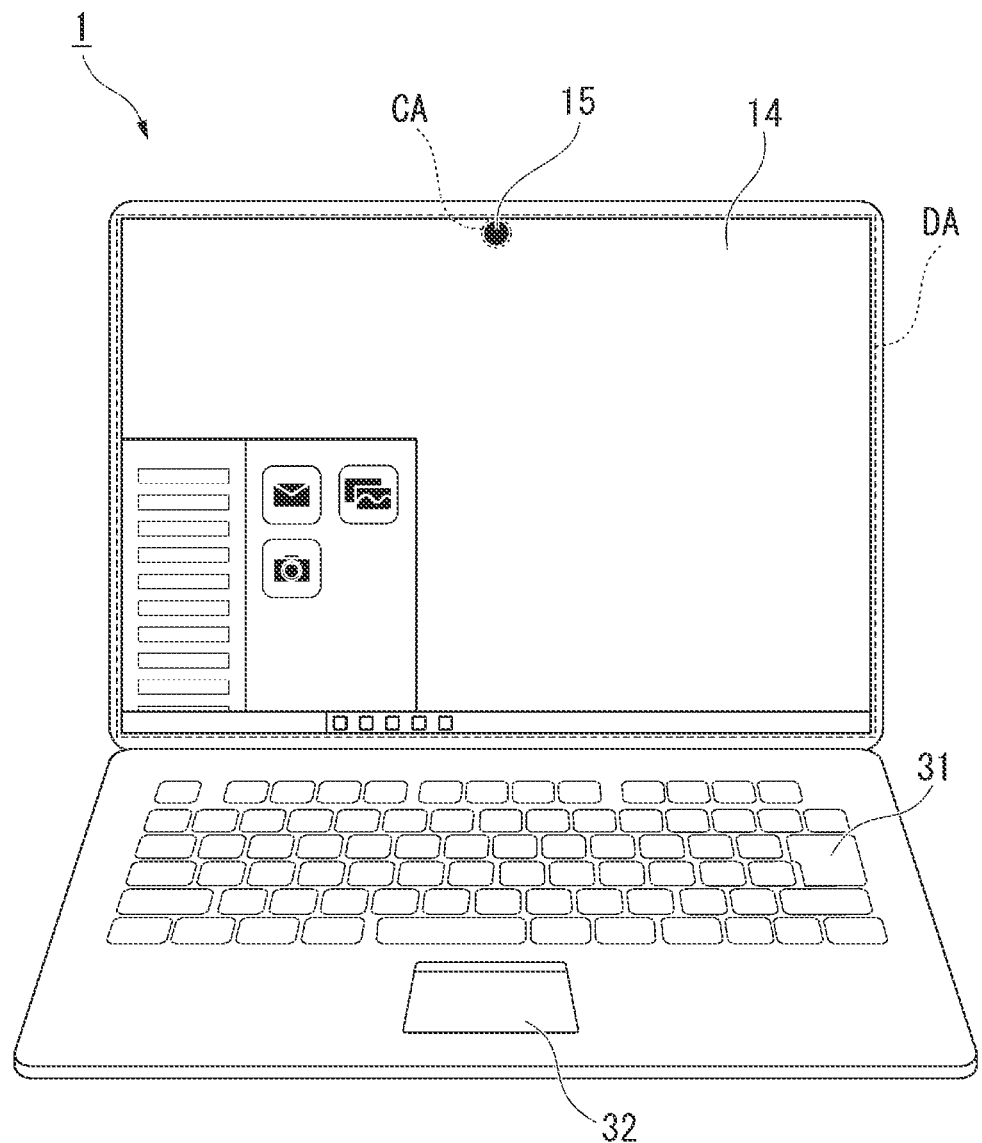
FIG. 1 illustrates the appearance of an example of the schematic configuration of the information processing apparatus according to a first embodiment.

FIG. 1 illustrates the appearance of an example of the schematic configuration of the information processing apparatus according to the present embodiment.

For instance, the information processing apparatus 1 illustrated is a laptop (clamshell-shaped) personal computer (PC). The information processing apparatus 1 includes a display 14, a camera 15, a keyboard 31, and a touchpad 32. The keyboard 31 and touchpad 32 are input devices that accept user's input operations.

The display 14 is an organic electroluminescence display (OLED) with an array of multiple pixels having organic light emitting diodes (OLEDs). Each pixel of the display 14 includes a light-emitting portion, electrodes such as an anode and a cathode, and a substrate, which are not illustrated. For instance, the light emitting portion includes an OLED that emits red light, an OLED that emits blue light, and an OLED that emits green light. The electrodes are made of ITO (Indium Tin Oxide) or other materials with good light transmittance. The substrate is a glass substrate, a polyimide substrate, or the like. Thus, each pixel of the display 14 includes a light-transmitting material.

The camera 15 is placed near the rear face (back face) of the display 14 in an orientation to capture images toward the display 14. In other words, the camera 15 captures images based on light incident through the display 14 (light from the display surface of the display 14). For example, the camera 15 includes a lens and an imaging sensor (not illustrated), and captures an image with an angle of view defined by the specifications of the lens and imaging sensor.

The information processing apparatus is configured so that, when the camera 15 is on (i.e., when the function of camera 15 runs), the display on the display 14 (light emission from the pixels) does not affect the image captured by the camera 15. Specifically, as illustrated in FIG. 1, the light emission of pixels in the portion of the camera area CA corresponding to the angle of view of the camera 15 in the screen area DA of the display 14 has to be stopped to turn the display off (non-display). The camera area CA is set to a range that is equal to or slightly wider than the angle of view of the camera 15. This prevents the display (light emission from pixels) of the display 14 from being reflected in the captured image of the camera 15, thereby improving the quality of the captured image.

Figure 2:
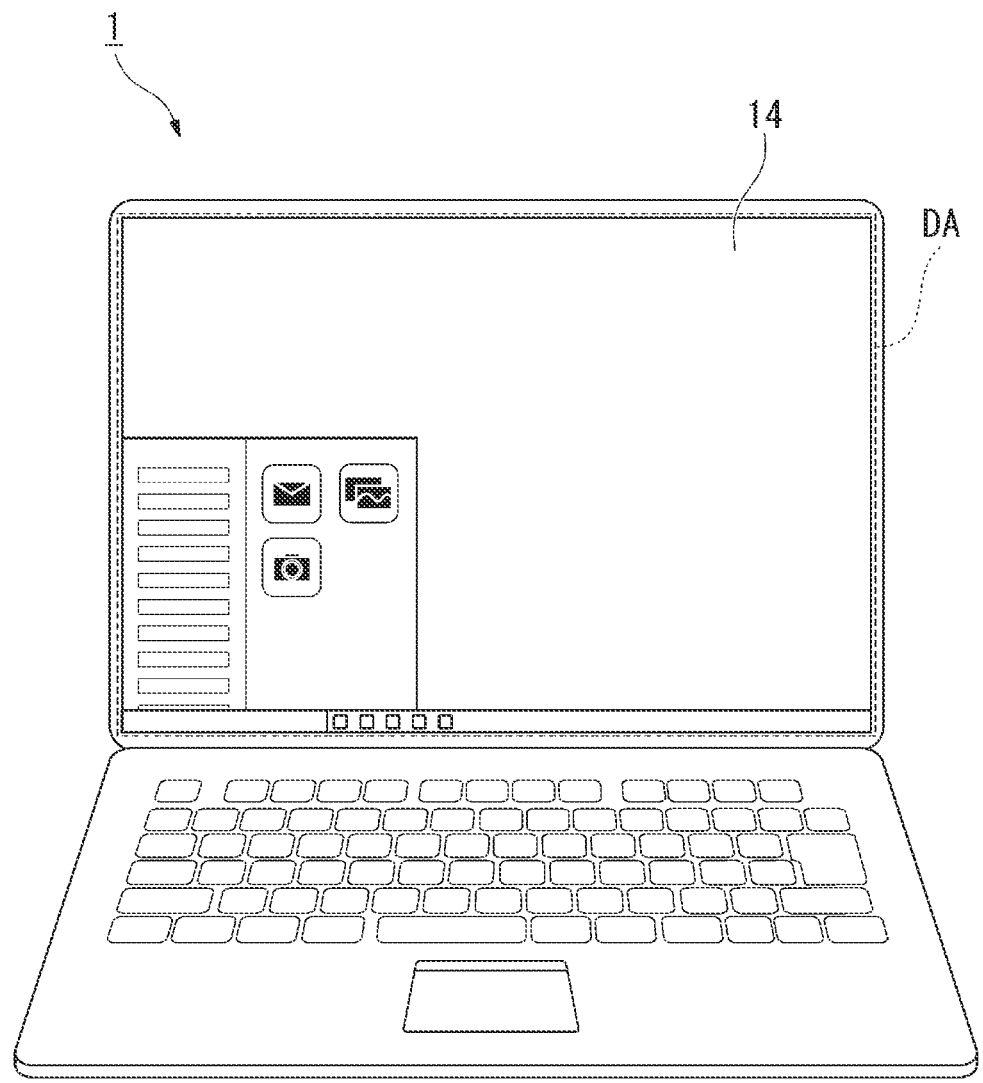
FIG. 2 illustrates the appearance of an example of the schematic configuration of the information processing apparatus according to the first embodiment when the camera is off.

When the camera 15 is off (i.e., when the function of camera 15 does not run), there is no need to worry about the effect on the captured image from the camera 15. Therefore, as illustrated in FIG. 2, the camera area CA also is displayed, so that the image is displayed over the entire screen area DA of the display 14. FIG. 2 illustrates the appearance of an example of the schematic configuration of the information processing apparatus according to the present embodiment when the camera 15 is off.

In this way, when the camera 15 is on, the information processing apparatus 1 controls the camera area CA to be non-displayed, so that the image is displayed in the screen area DA other than the camera area CA of the display 14. When the camera 15 is off, the information processing apparatus 1 controls to display also in the camera area CA, so that the image is displayed on the entire screen area DA of the display 14.

Figures 3A, 3B, 3C:
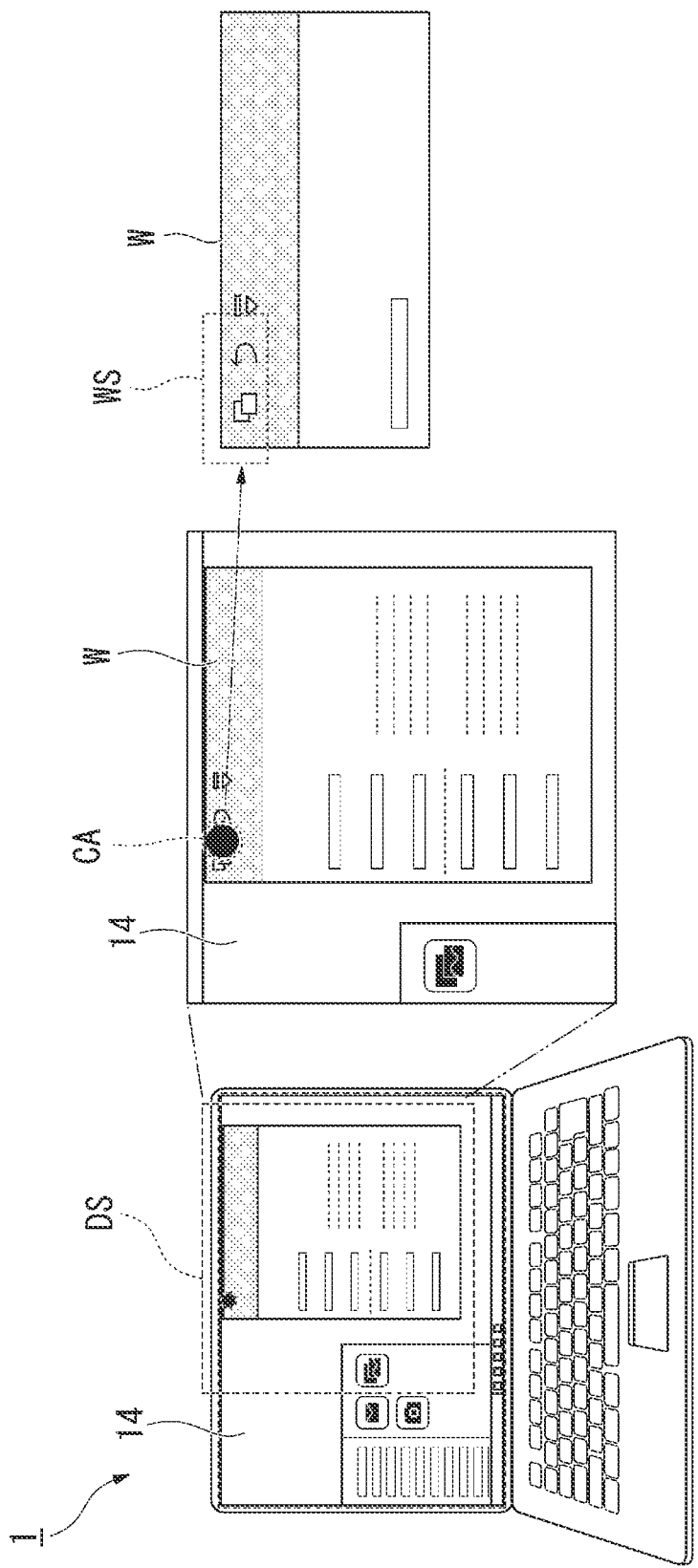
FIGS. 3A-3C illustrate an example of the display when the camera area according to the first embodiment is non-displayed.

FIGS. 3A-3C illustrate an example of the display when the camera area CA according to the present embodiment is non-displayed. FIG. 3B is an enlarged view of the range indicated by DS on the display 14 of the information processing apparatus 1 in FIG. 3A. As illustrated in FIG. 3B, the display 14 displays a window W of an application. As illustrated in FIG. 3C, the area indicated by WS of the window W actually contains display data of the contents (e.g., operation buttons) that the user operates. When displayed on the display 14, however, the portion of the camera area CA is non-displayed and no contents are displayed as illustrated in FIG. 3B. This means that the image based on the display data corresponding to the camera area CA is not displayed. Therefore, when performing an operation on an operation button or other contents that are not displayed in this portion of the camera area CA, the user may make an operation error because the operation has to be performed while the operation target is not visible.

Then, the information processing apparatus 1 according to the present embodiment is configured so that, when the user's operation position is within the camera area CA, the image based on the display data corresponding to the camera area CA is displayed in any part of the screen area DA of the display 14. For instance, when the user's operation position is within the camera area CA, the information processing apparatus 1 restores the display of the camera area CA that has been controlled to be non-displayed. That is, the information processing apparatus 1 displays the image in the camera area CA based on the display data corresponding to the camera area CA in the same way as when the camera 15 is off.

Figures 4A, 4B:
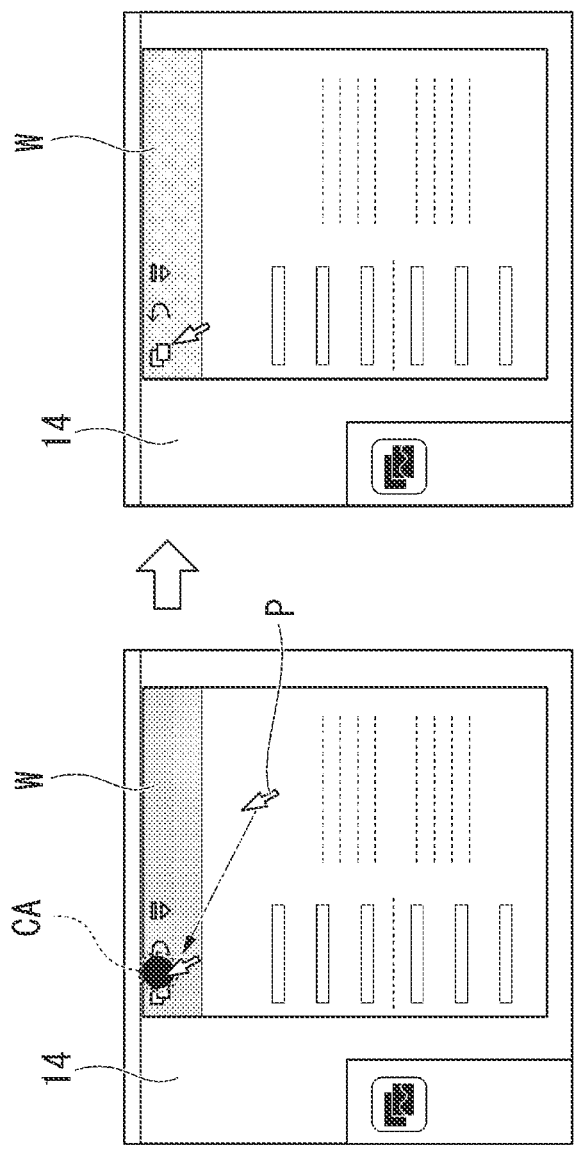
FIGS. 4A and 4B describe an example of the restoring of the display in the camera area according to the first embodiment.

FIGS. 4A and 4B describe an example of the restoring of the display in the camera area CA according to the present embodiment. FIG. 4A illustrates the same situation as in FIG. 3B. As illustrated in FIG. 4A, the display 14 displays a window W of an application, where the portion of the camera area CA is non-displayed. When the cursor P, indicating the user's operation position, enters the camera area CA, the display of the camera area CA, which has been controlled to be non-displayed, is restored and the image based on the display data corresponding to the camera area CA in window W is displayed in the camera area CA as illustrated in FIG. 4B. This allows the user to operate the apparatus while viewing the operation target because the display of the camera area CA is restored when the user's operation position moves into the camera area CA, even if the portion of the camera area CA is controlled to be non-displayed. The following is a detailed description on the configuration and process of the present embodiment.

[Hardware Configuration of Information Processing Apparatus]

Figure 5:
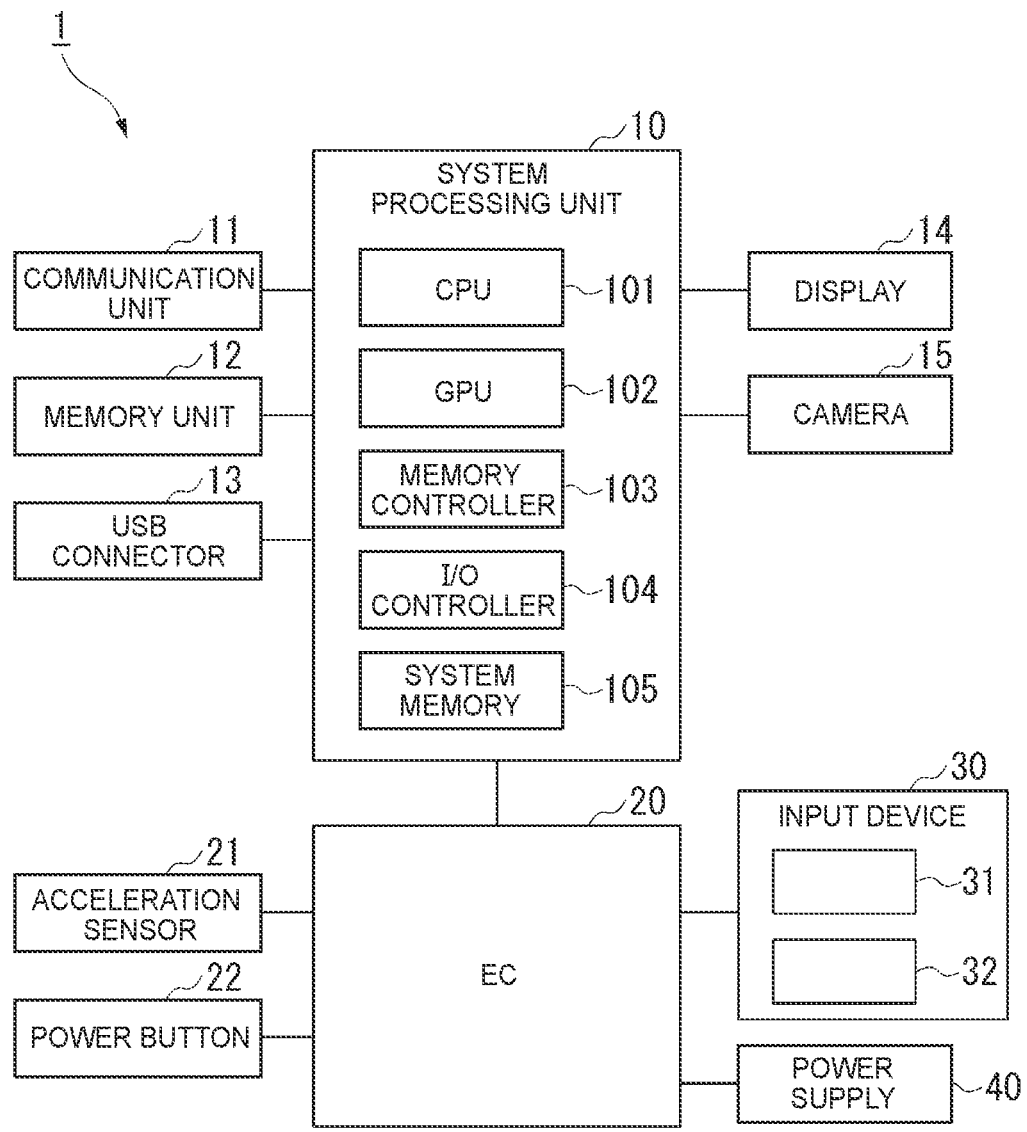
FIG. 5 is a block diagram illustrating one example of the hardware configuration of the information processing apparatus according to the first embodiment.

FIG. 5 is a block diagram illustrating one example of the hardware configuration of an information processing apparatus 1 according to the present embodiment. In FIG. 5, like numbers indicate like components in FIG. 1. The information processing apparatus 1 includes a system processing unit 10, a communication unit 11, a memory unit 12, a USB connector 13, a display 14, a camera 15, an embedded controller (EC) 20, an acceleration sensor 21, a power button 22, an input device 30, and a power supply 40.

The system processing unit 10 includes a central processing unit (CPU) 101, a graphic processing unit (GPU) 102, a memory controller 103, an input-output (I/O) controller 104, and a system memory 105, and enables the process of various application programs on the operating system (OS) through the system process based on the OS. The CPU 101, GPU 102, etc. may be referred to as processors.

The CPU 101 executes process by the OS and process by programs such as drivers, services, and applications that operate on the OS.

The GPU 102 is connected to the display 14. The GPU 102 executes image process under the control of the CPU 101 to generate display data. The GPU 102 outputs the generated display data to the display 14 and causes the display 14 to display an image based on the display data. The CPU 101 and the GPU 102 may be integrated into a single core, or may be formed as individual cores.

The memory controller 103 controls reading and writing of data from and on the system memory 105, the memory unit 12, or the like under the control of the CPU 101 and the GPU 102, for instance.

The I/O controller 104 controls input/output of data to/from the communication unit 11, the USB connector 13, the display 14, the camera 15, and the EC 20.

The system memory 105 includes a random access memory (RAM) and other components, and is used as a read area for executable programs and a work area for writing process data. The system memory 105 also temporarily stores image data of an image captured by the camera 15, and the display data generated by the GPU 102 and to be displayed on the display 14, for instance.

The system processing unit 10 may be configured as a single package that is a system on a chip (SOC), or part of the functions may be configured as a separate component such as a chipset or sensor hub.

The communication unit 11 is communicatively connected to other devices via a wireless or wired communication network to transmit and receive various types of data. For instance, the communication unit 11 includes a wired LAN interface such as Ethernet (registered trademark) and a wireless LAN interface such as Wi-Fi (registered trademark). The communication unit 11 also includes a near field communication interface such as Bluetooth (registered trademark).

The memory unit 12 includes a storage medium such as a hard disk drive (HDD), solid state drive (SDD), read only memory (ROM), or flash ROM. The memory unit 12 stores various programs such as an operating system (OS), device drivers, and applications, as well as other various types of data acquired through the operation of the programs.

The USB connector 13 is for connection to peripheral devices via a universal serial bus (USB). For instance, the USB connector 13 is connected to an external keyboard, mouse, etc. via a USB cable.

The display 14 displays images based on display data generated based on system process executed by the system processing unit 10 and process of application programs running on the system process, for instance.

As described with reference to FIG. 1, the camera 15 is placed near the rear face (back face) of the display 14 in an orientation to capture images toward the display 14. The camera 15 captures an image based on light incident through the display 14 (light from the display surface of the camera area CA of the display 14), and outputs the captured image to the system processing unit 10.

The EC 20 is a microcomputer that includes a CPU, a random access memory (RAM), a read only memory (ROM), a flash ROM, multiple channels of A/D input terminals, D/A output terminals, and digital input/output terminals. For instance, the CPU of the EC 20 reads a control program (firmware) stored in advance in its own or external ROM and executes the read control program to perform its function. The EC 20 is connected to the acceleration sensor 21, the power button 22, the input device 30, the system processing unit 10, and the power supply 40, for example.

The acceleration sensor 21 detects the orientation of the information processing apparatus 1 relative to the direction of gravity, and outputs a detection signal indicating the detection result to the EC 20. Instead of or in addition to the acceleration sensor 21, the information processing apparatus 1 may include a gyro sensor, an inclination sensor, and a geomagnetic sensor.

The power button 22 is an operator that accepts operations to turn on or off the power of the information processing apparatus 1. The power button 22 outputs an operation signal to the EC 20 according to user's operation.

The input device 30 is an input unit that accepts user's input, and includes a keyboard 31 and a touchpad 32, for example. The input device 30 outputs an operation signal indicating the contents of the operation to the EC 20 in response to receiving user operation with the keyboard 31 or touchpad 32.

The EC 20 acquires a detection signal from the acceleration sensor 21 and detects the orientation of the information processing apparatus 1, for instance, based on the acquired detection signal. The EC 20 also acquires an operation signal from the input devices 30, for instance, and outputs the acquired operation signal, which is necessary for process by the system processing unit 10, to the system processing unit 10. When receiving an operation signal in response to user's operation with the power button 22, the EC 20 gives an instruction to the system processing unit 10 to start up the system, for instance. The EC 20 also communicates with the power supply 40 to obtain information on the state of the battery (e.g., remaining capacity) from the power supply 40, and outputs a control signal, for instance, to the power supply 40 to control the supply of power according to the operating state of various parts of the information processing apparatus 1.

The power supply 40 supplies power through a power supply system that supplies power to various units of the information processing apparatus 1 according to the operating state of these units. For instance, the power supply 40 includes a DC (direct current)/DC converter. The DC/DC converter converts the DC power voltage supplied from an AC (alternate current)/DC adapter or battery pack into the voltage required by the various units. The electric power whose voltage is converted by the DC/DC converter is supplied to each of the various units via the corresponding power supply system. For instance, the power supply 40 supplies power to each of the various units via the corresponding power supply system based on a control signal from the EC 20.

[Functional Configuration]

Next, the following describes the functional configuration of the camera area display control process. In this process, the information processing apparatus 1 controls the display or non-display of the camera area CA according to the user's operation position when displaying an image on the screen area DA of the display 14.

Figure 6:
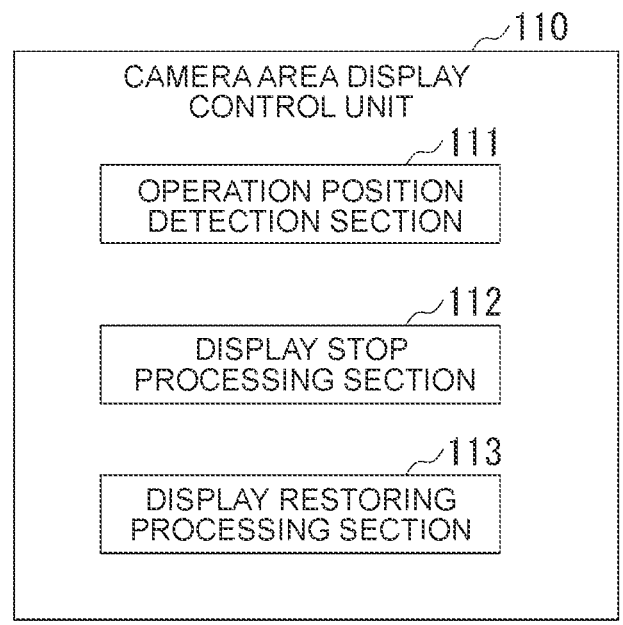
FIG. 6 is a block diagram illustrating one example of the functional configuration of the information processing apparatus according to the first embodiment.

FIG. 6 is a block diagram illustrating one example of the functional configuration of the information processing apparatus 1 according to the present embodiment. The information processing apparatus 1 has a camera area display control unit 110, which is a functional configuration implemented by the system processing unit 10 (e.g., CPU 101) executing a program. The camera area display control unit 110 has an operation position detection section 111, a display stop processing section 112, and a display restoring processing section 113.

The operation position detection section 111 detects the user's operation position within the screen area DA of the display 14. For instance, the operation position detection section 111 acquires an operation signal according to the user's operation with the touchpad 32 via the EC 20, and detects the user's operation position based on the acquired operation signal. When a mouse is connected to the communication unit 11 or the USB connector 13, the operation position detection section 111 acquires an operation signal according to the user's operation with the mouse via the communication unit 11 or the USB connector 13, and detects the user's operation position based on the acquired operation signal.

The display stop processing section 112 performs display stop process to stop the emission of light from the pixels in the camera area CA corresponding to the position in the screen area DA of the display 14 where the camera 15 is placed, and control the pixels to be non-displayed. For instance, when the camera 15 is on (i.e., the function of the camera 15 runs), the display stop processing section 112 stops the emission of light from the pixels in the camera area CA and controls them to be non-displayed (see FIG. 1). When the camera 15 is off (i.e., when the function of the camera 15 does not run), the display stop processing section 112 does not perform the display stop process. That is, when the camera 15 is off, the image is displayed also in the camera area CA (see FIG. 2).

When the user's operation position detected by the operation position detection section 111 is within the camera area CA, the display restoring processing section 113 performs display restoring process to display the image based on the display data corresponding to the camera area CA in any part of the screen area DA of the display 14. For instance, when the user's operation position detected by the operation position detection section 111 is within the camera area CA, the display restoring processing section 113 restores the display in the camera area CA. That is, when the user's operation position detected by the operation position detection section 111 is within the camera area CA, the display restoring processing section 113 controls the emission of light from the pixels in the camera area CA to display an image based on the display data corresponding to the camera area CA.

[Operation of Camera Area Display Control Process]

Next, the following describes operation of the camera area display control process executed by the information processing apparatus 1 (camera area display control unit 110).

Figure 7:
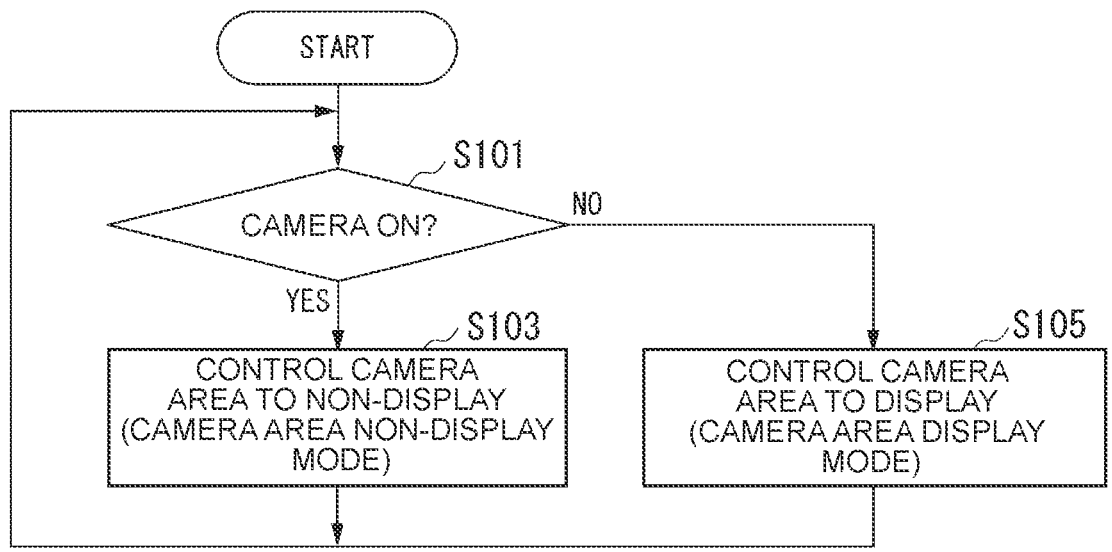
FIG. 7 is a flowchart illustrating an example of the camera area display control process according to the first embodiment.

FIG. 7 is a flowchart illustrating an example of the camera area display control process according to the present embodiment. The example in FIG. 7 illustrates the process for controlling display or non-display of the camera area CA depending on whether the camera 15 is on or not.

(Step S101) The camera area display control unit 110 determines whether the camera 15 is on. When the camera area display control unit 110 determines that the camera 15 is on (YES), the process proceeds to step S103. When the camera area display control unit 110 determines that the camera 15 is off (NO), the process proceeds to step S105.

(Step S103) The camera area display control unit 110 controls the camera area CA to be non-displayed (see FIG. 1). Hereinafter this display control mode that controls the camera area CA to be non-displayed is referred to as "camera area non-display mode."

(Step S105) The camera area display control unit 110 controls the camera area CA to be displayed (see FIG. 2). Hereinafter this display control mode that controls the camera area CA to be displayed is referred to as "camera area display mode."

Next, the following describes operation of the camera area display restoring process. In this process, the information processing apparatus 1 restores the display of the camera area CA in the camera area non-display mode according to the user's operation position.

Figure 8:
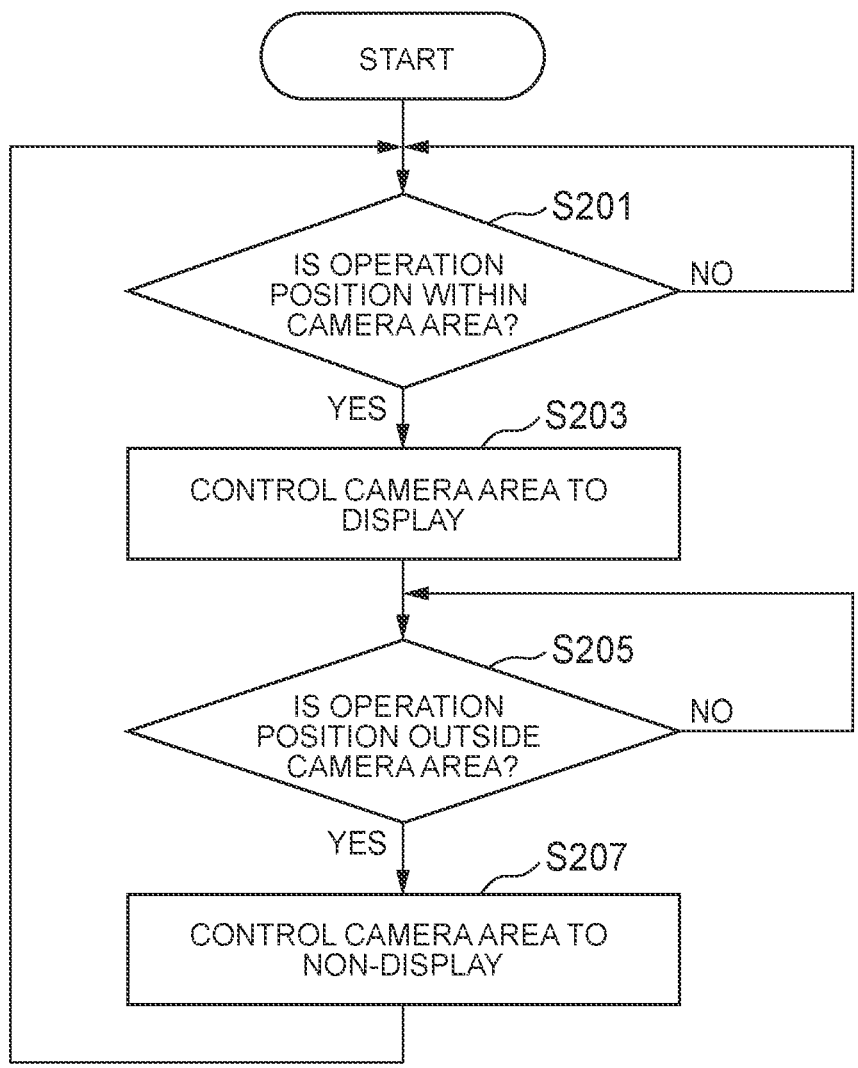
FIG. 8 is a flowchart illustrating an example of the camera area display restoring process according to the first embodiment.

FIG. 8 is a flowchart illustrating one example of the camera area display restoring process according to the present embodiment. In this process, the camera area non-display mode is a prerequisite. Thus, as illustrated in FIG. 1, the camera area display control unit 110 controls the camera area CA to be non-displayed.

(Step S201) The camera area display control unit 110 determines whether the user's operation position is within the camera area CA. When the camera area display control unit 110 determines that the user's operation position is within the camera area CA (YES), the process proceeds to step S203. When the camera area display control unit 110 determines that the user's operation position is not within the camera area CA (i.e., outside the camera area CA) (NO), the process performs step S201 again.

(Step S203) The camera area display control unit 110 controls the camera area CA to be displayed. That is, the camera area display control unit 110 restores the display of the camera area CA (see FIG. 3). Then the process proceeds to step S205.

(Step S205) The camera area display control unit 110 determines whether the user's operation position is outside the camera area CA. When the camera area display control unit 110 determines that the user's operation position is outside the camera area CA (YES), the process proceeds to step S207. When the camera area display control unit 110 determines that the user's operation position is not outside the camera area CA (i.e., within the camera area CA) (NO), the process performs step S205 again.

(Step S207) The camera area display control unit 110 controls the camera area AC to be non-displayed, and then the process returns to step S201. That is, the camera area display control unit 110 controls the camera area CA to be displayed only when the user's operation position is within the camera area CA, and returns the camera area CA to be non-displayed when the user's operation position becomes outside the camera area CA.

Summary Of The First Embodiment

As described above, the information processing apparatus 1 according to the present embodiment includes the display 14 having a screen area with an array of a plurality of pixels; the camera 15 near the rear face of the display 14 to capture an image based on light incident through the display 14; the system memory 105 (one example of a memory) that temporarily stores display data to be displayed on the display 14; and the system processing unit 10 (one example of a processor). The system processing unit 10 controls light emission of a plurality of pixels of the display 14 based on the display data stored in the system memory 105, thus causing the display 14 to display an image based on the display data. For instance, the system processing unit 10 includes the camera area display control unit 110, and performs display stop process, operation position detection process, and display restoring process. For instance, the camera area display control unit 110 performs the display stop process to stop the emission of light from the pixels in the camera area CA (one example of a first area) corresponding to the position in the screen area DA of the display 14 where the camera 15 is placed and control the pixels to be non-displayed. The camera area display control unit 110 also performs the operation position detection process to detect the user's operation position within the screen area DA of the display 14. When the user's operation position detected by the operation position detection process is within the camera area CA, the camera area display control unit 110 performs the display restoring process to display the image based on the display data corresponding to the camera area CA in any part of the screen area DA of the display 14.

This allows the information processing apparatus 1, which has the camera 15 near the rear face of the display 14 to capture an image of light transmitted through the screen area DA of the display 14, to stop the emission of light from the pixels in the camera area CA to control the pixels to be non-displayed, and to display the image based on the display data corresponding to the camera area CA when the user's operation position is within the camera area CA. This configuration allows the user to operate the apparatus while looking at the operation target. Thus, the information processing apparatus 1 enables appropriate control of the display on the display 14.

For instance, when the function of the camera 15 runs (the camera 15 is on), the camera area display control unit 110 performs the display stop process to stop the emission of light from the pixels in the camera area CA and control them to be non-displayed.

This allows the information processing apparatus 1 to ensure that the display on the display 14 does not interfere with the functions of the camera 15 when the camera 15 is on, thus preventing deterioration in quality of the image captured by the camera 15.

In the display restoring process, when the user's operation position detected by the operation position detection process is within the camera area CA, the camera area display control unit 110 controls the emission of light from the pixels in the camera area CA to display an image based on the display data corresponding to the camera area CA.

With this configuration, when the user's operation position is within the camera area CA, the information processing apparatus 1 displays the image based on the display data corresponding to the camera area CA in the camera area CA. This allows the user to intuitively operate the information processing apparatus 1 while looking at the operation target.

A control method for the information processing apparatus 1 according to the present embodiment includes: the camera area display control unit 110 stopping the emission of light from the pixels in the camera area CA (one example of a first area) corresponding to the position in the screen area DA of the display 14 where the camera 15 is placed and controlling the pixels to be non-displayed; detecting the user's operation position within the screen area DA of the display 14; and when the detected operation position is within the camera area CA, displaying the image based on the display data corresponding to the camera area CA in any part of the screen area DA of the display 14.

This allows the information processing apparatus 1, which has the camera 15 near the rear face of the display 14 to capture an image of light transmitted through the screen area DA of the display 14, to stop the emission of light from the pixels in the camera area CA to control the pixels to be non-displayed, and to display the image based on the display data corresponding to the camera area CA when the user's operation position is within the camera area CA. This configuration allows the user to operate the apparatus while looking at the operation target. Thus, the information processing apparatus 1 enables appropriate control of the display on the display 14.

Second Embodiment

The following describes a second embodiment of the present invention.

The first embodiment describes the camera area display restoring process, in which the information processing apparatus restores the display of the camera area CA in the camera area non-display mode according to the user's operation position. Depending on the operating state of the camera 15, the information processing apparatus may be configured to prohibit the execution of this camera area display restoring process.

For instance, while the camera 15 is in the process of capturing moving images, if the camera area CA is changed from non-display to display, the emission of light from pixels in the camera area CA will affect the captured images. Therefore, the camera area display control unit 110 (display restoring processing section 113) prohibits the execution of the camera area display restoring process when the camera 15 is capturing moving images. Note here that during "capturing of moving images" refers to, for example, during capturing of imaging data to be recorded in the form of moving images. In other words, in this embodiment, the execution of the camera area display restoring process is prohibited so that the data recorded by the camera 15 is not affected.

Figure 9:
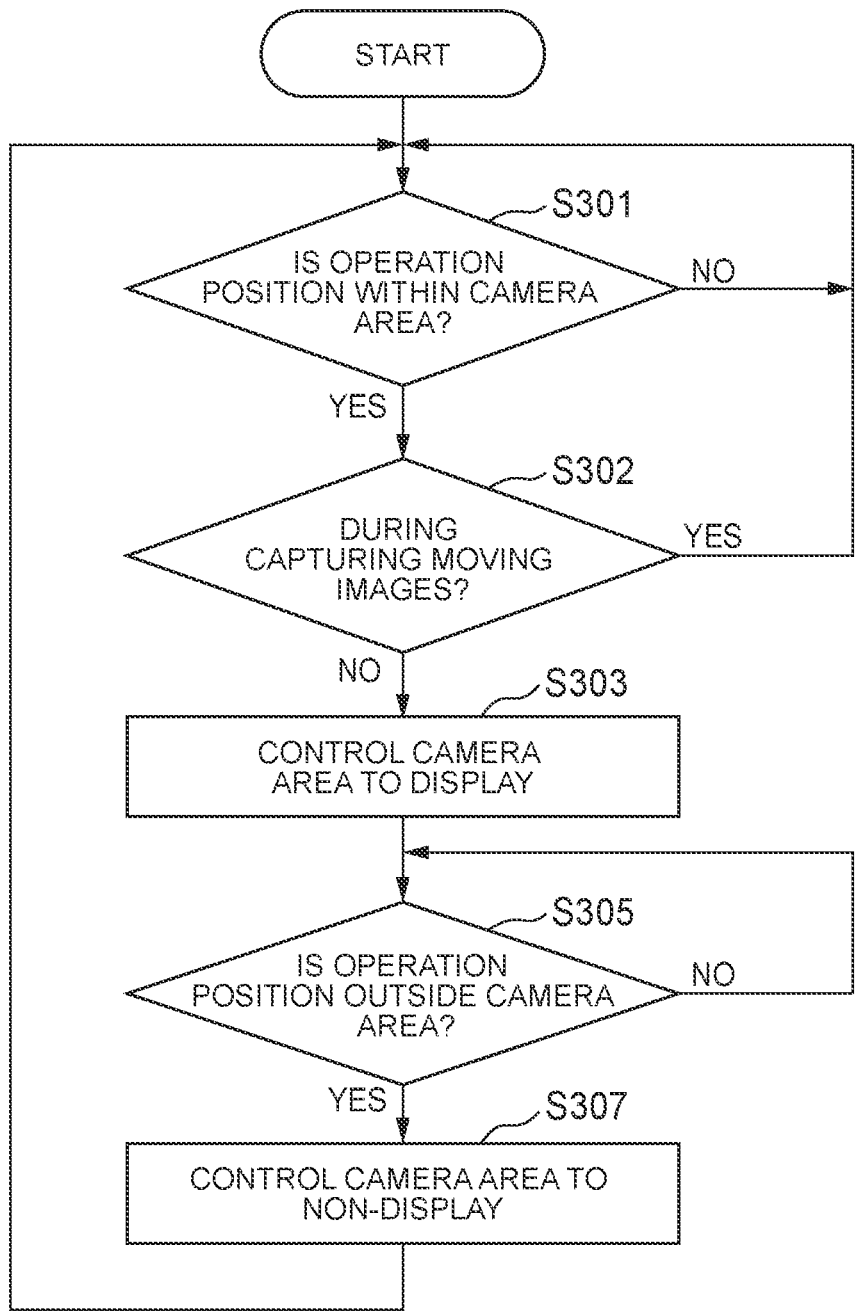
FIG. 9 is a flowchart illustrating an example of the camera area display restoring process according to the second embodiment.

FIG. 9 is a flowchart illustrating one example of the camera area display restoring process according to the present embodiment. In this process, the camera area non-display mode is a prerequisite. Thus, as illustrated in FIG. 1, the camera area display control unit 110 controls the camera area CA to be non-displayed.

(Step S301) The camera area display control unit 110 determines whether the user's operation position is within the camera area CA. When the camera area display control unit 110 determines that the user's operation position is within the camera area CA (YES), the process proceeds to step S302. When the camera area display control unit 110 determines that the user's operation position is not within the camera area CA (i.e., outside the camera area CA) (NO), the process performs step S301 again.

(Step S302) The camera area display control unit 110 determines whether the camera 15 is capturing moving images. For instance, the camera area display control unit 110 obtains information indicating the operating state of the camera 15 from the camera 15 to determine whether the camera 15 is capturing moving images. When the camera area display control unit 110 determines that the camera 15 is capturing moving images (YES), the process returns to step S301. That is, even if the user's operation position is within the camera area CA, the camera area display control unit 110 does not restore the display of the camera area CA when the camera 15 is capturing moving images.

When the camera area display control unit 110 determines that the camera 15 is not capturing moving images (NO), the process proceeds to step S303. Subsequent steps S303, S305 and S307 are the same as steps S203, S205 and S207 in FIG. 8. That is, the camera area display control unit 110 controls the camera area CA to be displayed (step S303), and then, when the camera area display control unit 110 determines that the user's operation position is outside the camera area CA (step S305: YES), the camera area display control unit 110 controls the camera area CA to be non-displayed (step S307). Then, the process returns to step S301.

In addition to the case where the camera 15 is capturing moving images, the camera area display control unit 110 may prohibit the execution of the camera area display restoring process in the same way when the camera 15 is capturing image data to record still images (e.g., capturing still images using long time exposure).

Summary of the Second Embodiment

As described above, in this information processing apparatus 1 according to the present embodiment, the camera area display control unit 110 prohibits the execution of the camera area display restoring process according to the operating state of the camera 15.

This allows the information processing apparatus 1 to keep the camera area CA non-displayed even if the user's operation position is within the camera area CA, when the camera 15 is capturing moving images (or capturing still images by long time exposure), for instance. That is, the information processing apparatus 1 ensures that the display on the display 14 does not interfere with the functions of the camera 15, and thus prevents deterioration in quality of the images captured by the camera 15. Thus, the information processing apparatus 1 enables appropriate control of the display on the display 14.

Depending on the operating state of the camera 15, the camera area display control unit 110 may display the camera area CA with a reduced amount of light emitted from the pixels in the camera area CA, instead of prohibiting the execution of the camera area display restoring process. Specifically, in the camera area display restoring process, the camera area display control unit 110 controls the emission of light from the pixels in the camera area CA to display an image based on the display data corresponding to the camera area CA. In this process, the camera area display control unit 110 displays the camera area CA with a reduced amount of light emitted from the pixels, depending on the operating state of the camera 15. For instance, when the camera 15 is capturing moving images (or still images by long time exposure), the camera area display control unit 110 converts the display data corresponding to the camera area CA to darker display data and displays the image based on the converted display data in the camera area CA.

For instance, when the camera 15 is capturing moving images (or capturing still images by long time exposure), the user may want to display the contents in the camera area CA. In this case also, the information processing apparatus 1 of this embodiment displays the contents darker, and thus suppresses the influences (reflection) on the camera 15 from the light emission in the pixels.

Third Embodiment

The following describes a third embodiment of the present invention.

The above embodiments describe the camera area display restoring process, in which the information processing apparatus restores the display of the camera area CA in the camera area non-display mode according to the user's operation position. In another embodiment, the user may instruct whether this camera area display restoring process is to be executed or not.

For instance, the information processing apparatus 1 may provide the user with an operation user interface (UI) that allows the user to select either a display priority setting that executes the camera area display restoring process or a camera priority setting that does not execute the camera area display restoring process, thus allowing the user to select between display priority and camera priority. The camera area display control unit 110 (display restoring processing section 113) executes the camera area display restoring process when the user selects display priority, and does not execute the camera area display restoring process when the user selects camera priority.

Figure 10:
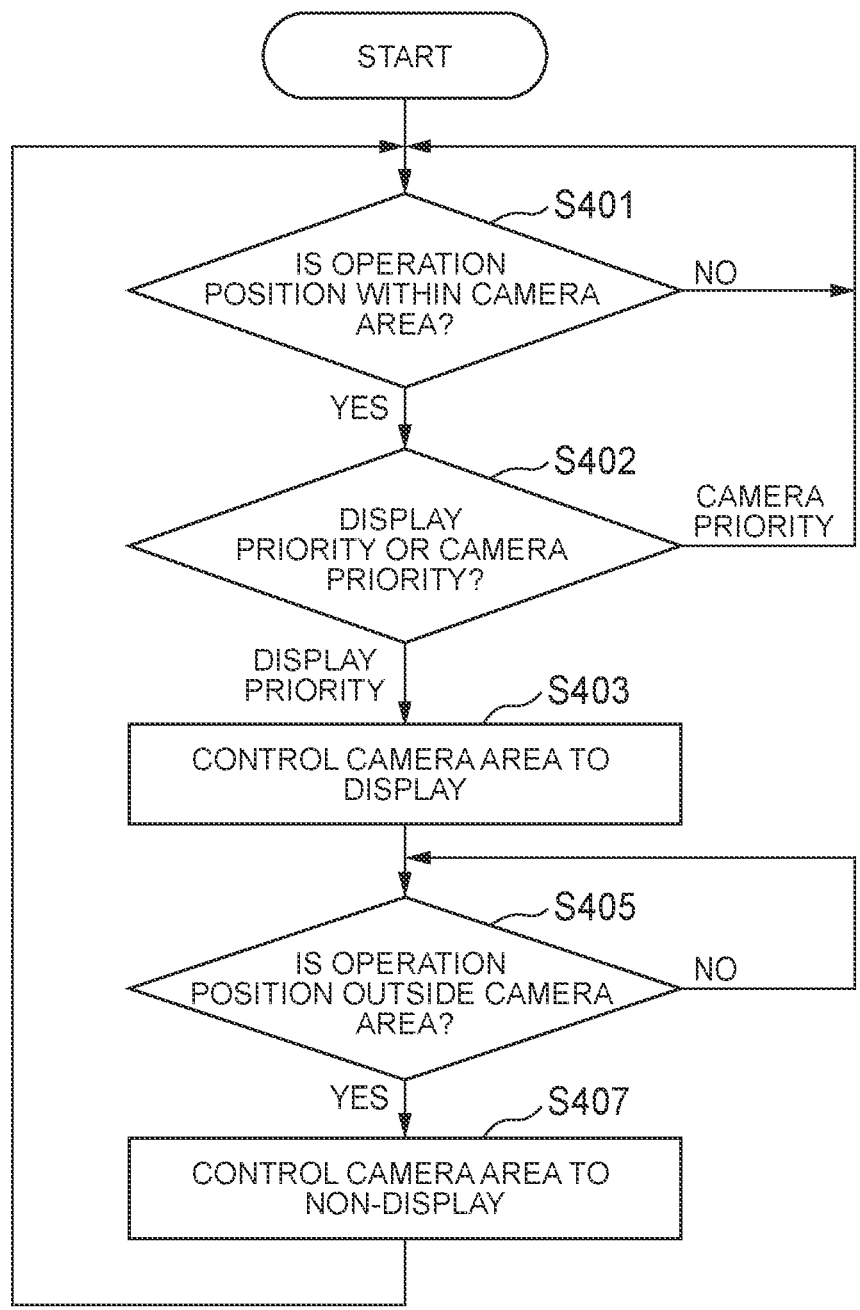
FIG. 10 is a flowchart illustrating an example of the camera area display restoring process according to the third embodiment.

FIG. 10 is a flowchart illustrating one example of the camera area display restoring process according to the present embodiment. In this process, the camera area non-display mode is a prerequisite. Thus, as illustrated in FIG. 1, the camera area display control unit 110 controls the camera area CA to be non-displayed.

(Step S401) The camera area display control unit 110 determines whether the user's operation position is within the camera area CA. When the camera area display control unit 110 determines that the user's operation position is within the camera area CA (YES), the process proceeds to step S402. When the camera area display control unit 110 determines that the user's operation position is not within the camera area CA (i.e., outside the camera area CA) (NO), the process performs step S401 again.

(Step S402) The camera area display control unit 110 determines whether the user has selected display priority or camera priority. When the camera area display control unit 110 determines that the user selects camera priority, the process returns to step S401. That is, even if the user's operation position is within the camera area CA, the camera area display control unit 110 does not restore the display of the camera area CA when the user instructs camera priority.

When the camera area display control unit 110 determines that the user selects display priority, the process proceeds to step S403. Subsequent steps S403, S405 and S407 are the same as steps S203, S205 and S207 in FIG. 8. That is, the camera area display control unit 110 controls the camera area CA to be displayed (step S403), and then, when the camera area display control unit 110 determines that the user's operation position is outside the camera area CA (step S405: YES), the camera area display control unit 110 controls the camera area CA to be non-displayed (step S407). Then, the process returns to step S401.

Summary Of The Third Embodiment

As described above, in this information processing apparatus 1 according to the present embodiment, the camera area display control unit 110 permits or prohibits the execution of the camera area display restoring process according to user's instruction.

This allows the information processing apparatus 1 to control whether or not the camera area CA is left non-displayed when the user's operation position is within the camera area CA, as the user wishes. Thus, the information processing apparatus 1 enables appropriate control of the display on the display 14.

Fourth Embodiment

The following describes a fourth embodiment of the present invention.

The first embodiment describes an example, in which when the user's operation position is within the camera area CA in the camera area non-display mode, the display of the camera area CA is restored by controlling the camera area CA from non-display to display. Another embodiment may be configured to restore the display by displaying the image based on the display data corresponding to the camera area CA in an area other than the camera area CA while controlling the camera area CA to be non-displayed.

Figures 11A, 11B:
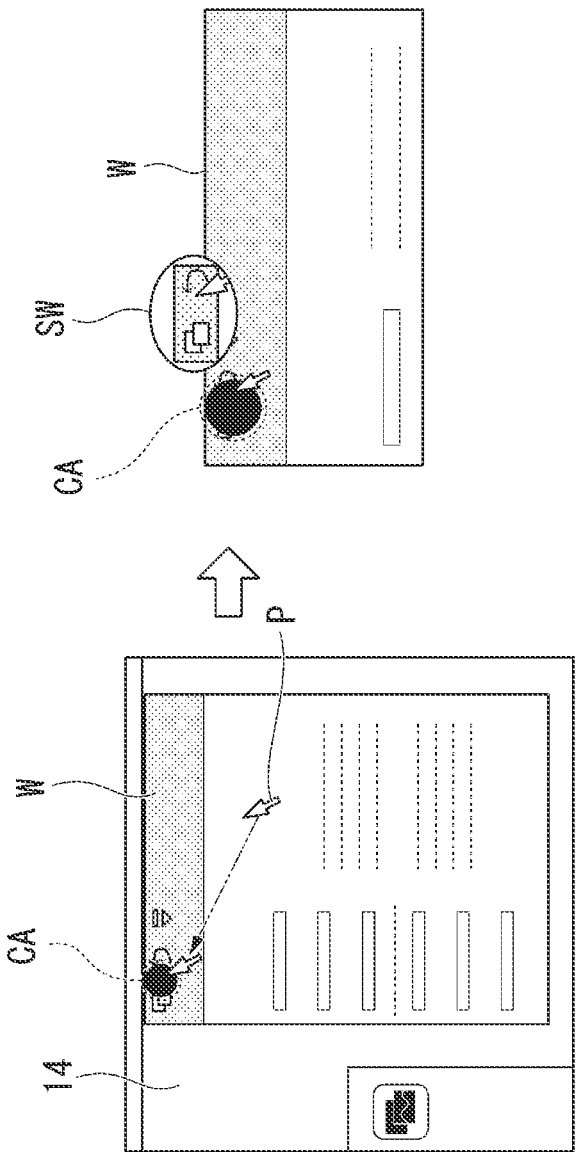
FIGS. 11A and 11B describe an example of the restoring of the display in the camera area according to the fourth embodiment.

FIGS. 11A and 11B describe an example of the restoring of the display in the camera area CA according to the present embodiment. FIG. 11A illustrates the same situation as in FIG. 3B and FIG. 4A. As illustrated in FIG. 11A, an application window W is displayed on the display 14, but the camera area CA is non-displayed. When the cursor P indicating the user's operation position enters the camera area CA, as illustrated in FIG. 11B, the image based on the display data corresponding to the camera area CA is displayed in the form of a pop-up screen SW in an area other than the camera area CA in the screen area DA of the display 14.

The pop-up screen SW displays a display image that includes a window W corresponding to the camera area CA and a cursor P. The pop-up screen SW may include an enlarged display image that includes the window W corresponding to the camera area CA and the cursor P. The pop-up screen SW may also display an image of a wider area than the camera area CA.

Figure 12:
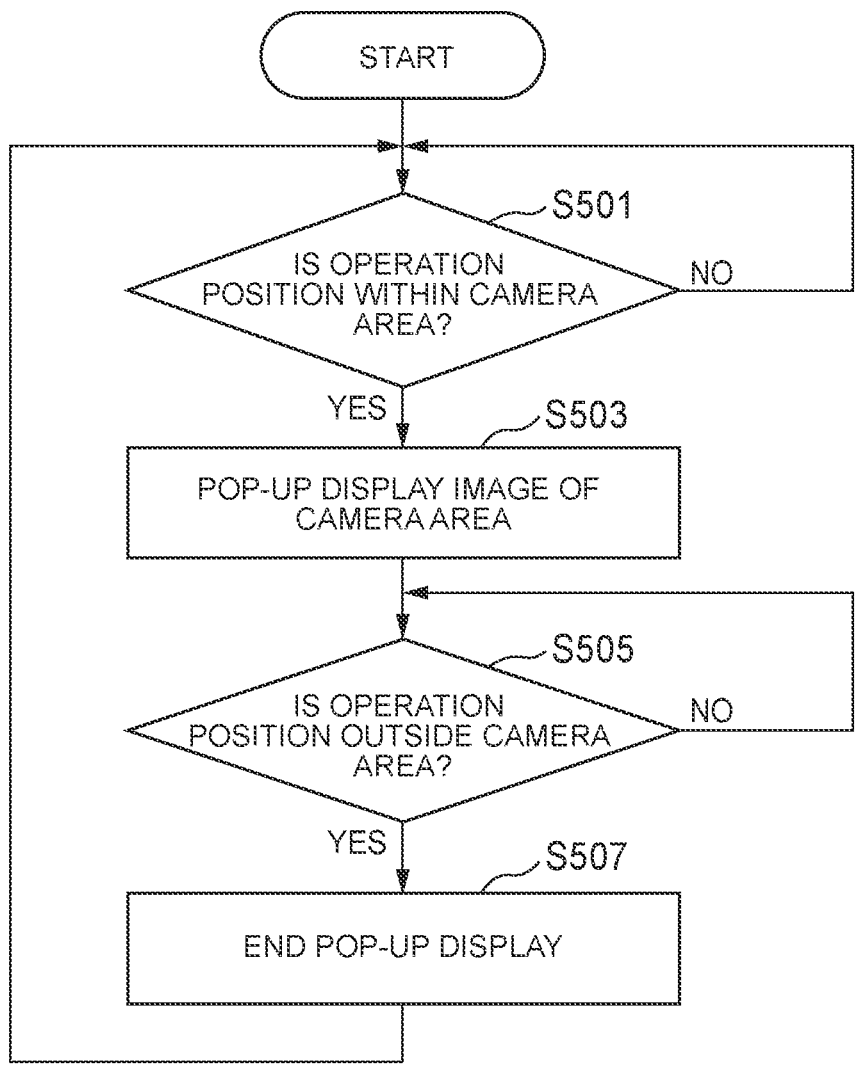
FIG. 12 is a flowchart illustrating a first example of the camera area display restoring process according to the fourth embodiment.

FIG. 12 is a flowchart illustrating a first example of the camera area display restoring process according to the present embodiment. In this process, the camera area non-display mode is a prerequisite. Thus, as illustrated in FIG. 1, the camera area display control unit 110 controls the camera area CA to be non-displayed.

(Step S501) The camera area display control unit 110 determines whether the user's operation position is within the camera area CA. When the camera area display control unit 110 determines that the user's operation position is within the camera area CA (YES), the process proceeds to step S503. When the camera area display control unit 110 determines that the user's operation position is not within the camera area CA (i.e., outside the camera area CA) (NO), the process performs step S501 again.

(Step S503) The camera area display control unit 110 displays the image in the form of a pop-up screen based on the display data corresponding to the camera area CA in an area other than the camera area CA. That is, the camera area display control unit 110 restores the display of the camera area CA to display it on the pop-up screen (see FIG. 11). Then the process proceeds to step S505.

(Step S505) The camera area display control unit 110 determines whether the user's operation position is outside the camera area CA. When the camera area display control unit 110 determines that the user's operation position is outside the camera area CA (YES), the process proceeds to step S507. When the camera area display control unit 110 determines that the user's operation position is not outside the camera area CA (i.e., within the camera area CA) (NO), the process performs step S505 again.

(Step S507) The camera area display control unit 110 ends the display of the pop-up screen displayed in step S505, and the process returns to step S501. That is, the camera area display control unit 110 displays the image of the camera area CA on the pop-up screen only when the user's operation position is within the camera area CA, and ends the pop-up screen display when the user's operation position is outside the camera area CA.

Also in this camera area display restoring process using the pop-up screen in the fourth embodiment, the user may instruct whether or not to execute the camera area display restoring process.

Figure 13:
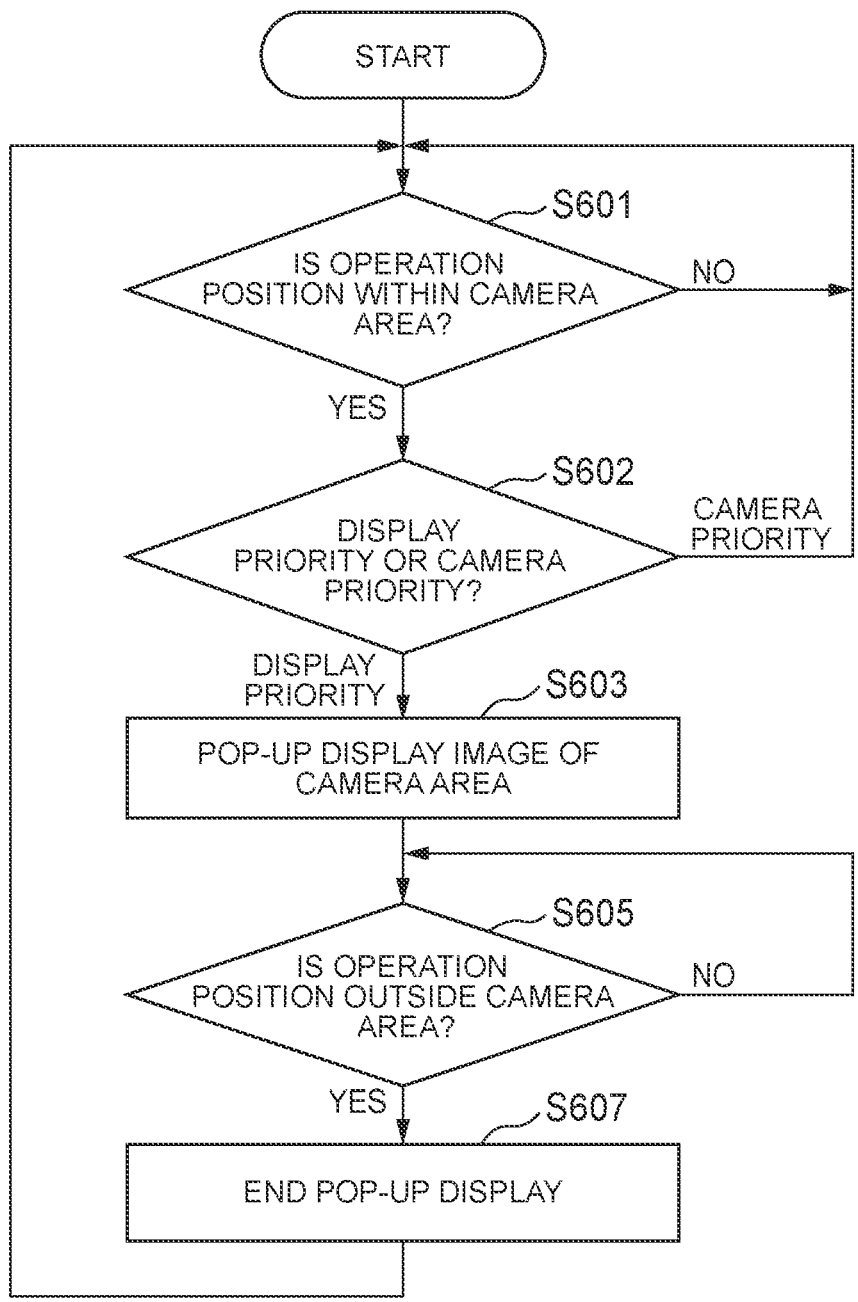
FIG. 13 is a flowchart illustrating a second example of the camera area display restoring process according to the fourth embodiment.

FIG. 13 is a flowchart illustrating a second example of the camera area display restoring process according to the present embodiment. In this process, the camera area non-display mode is a prerequisite. Thus, as illustrated in FIG. 1, the camera area display control unit 110 controls the camera area CA to be non-displayed.

(Step S601) The camera area display control unit 110 determines whether the user's operation position is within the camera area CA. When the camera area display control unit 110 determines that the user's operation position is within the camera area CA (YES), the process proceeds to step S602. When the camera area display control unit 110 determines that the user's operation position is not within the camera area CA (i.e., outside the camera area CA) (NO), the process performs step S601 again.

(Step S602) The camera area display control unit 110 determines whether the user has selected display priority or camera priority. When the camera area display control unit 110 determines that the user has selected camera priority, the process returns to step S601. That is, even if the user's operation position is within the camera area CA, the camera area display control unit 110 does not restore the display of the camera area CA when the user instructs camera priority.

When the camera area display control unit 110 determines that the user has selected display priority, the process proceeds to step S603. Subsequent steps S603, S605 and S607 are the same as steps S503, S505 and S507 in FIG. 8. That is, the camera area display control unit 110 controls to display the image based on the display data corresponding to the camera area CA on the pop-up screen (step S603), and after that, if it is determined that the user's operation position is outside the camera area CA (step S605: YES), the camera area display control unit 110 ends the display of the pop-up screen (step S607). Then, the process returns to step S601.

Summary Of The Fourth Embodiment

As described above, the information processing apparatus 1 according to the present embodiment is configured so that when the detected user's operation position is within the camera area CA, the camera area display control unit 110 controls to display the image based on the display data corresponding to the camera area CA (e.g., in the form of a pop-up screen) in an area other than the camera area CA of the screen area DA of the display 14.

With this configuration, when the user's operation position is within the camera area CA, the information processing apparatus 1 displays the image based on the display data corresponding to the camera area CA in an area other than the camera area CA (e.g., in the form of a pop-up screen). This allows the user to operate the information processing apparatus 1 while looking at the operation target. Thus, the information processing apparatus 1 enables appropriate control of the display on the display 14.

The camera area display control unit 110 may enlarge and display the image based on the display data corresponding to the camera area CA when displaying it in an area other than the camera area CA in the screen area DA of the display 14.

With this configuration, when the user's operation position is within the camera area CA, the information processing apparatus 1 displays the enlarged image based on the display data corresponding to the camera area CA in an area other than the camera area CA. This allows the user to easily operate the information processing apparatus 1 while looking at the operation target.

The camera area display control unit 110 may permit or prohibit the execution of the camera area display restoring process according to user's instruction.

This allows the information processing apparatus 1 to control whether or not to display the image based on the display data corresponding to the camera area CA in an area other than the camera area CA (e.g., in the form of a pop-up display) when the user's operation position is within the camera area CA, as the user wishes. Thus, the information processing apparatus 1 enables appropriate control of the display on the display 14.

Fifth Embodiment

The following describes a fifth embodiment of the present invention.

The above embodiments describe two types of processes of restoring the display of a camera area CA in the camera area non-display mode: a process to control the camera area CA from non-display to display (hereinafter referred to as "first display restoring process") as described with reference to FIG. 3; and a process to pop-up display the image in an area other than the camera area CA (hereinafter referred to as "second display restoring process") as described with reference to FIG. 11. This embodiment describes a configuration that allows selective switching between this first and second display restoring processes.

When the user's operation position detected by the operation position detection section 111 is within the camera area CA in the camera area non-display mode, the display restoring processing section 113 selectively switches between the first display restoring process, which displays an image based on the display data corresponding to the camera area CA while controlling the light emission of pixels in the camera area CA, and the second display restoring process, which pop-up displays an image based on the display data corresponding to the camera area CA in an area of the screen area of the display 14 other than the camera area CA.

For instance, the camera area display control unit 110 (display restoring processing section 113) switches between the first and second display restoring processes depending on the operating state of the camera 15. For instance, the operating state of the camera 15 includes the state of whether the camera 15 is capturing moving images or not. While the camera 15 is in the process of capturing moving images, if the camera area CA is changed from non-display to display, the emission of light from pixels in the camera area CA will affect the captured image. Therefore, it is preferable to perform the second display restoring process of pop-up displaying the image in an area other than the camera area CA. When the camera 15 is not capturing moving images and there is no need to be concerned about the effects on the captured image, the first display restoring process is selected because it displays an image based on the display data corresponding to the camera area CA in the camera area CA, which is intuitively easy to understand.

Figure 14:
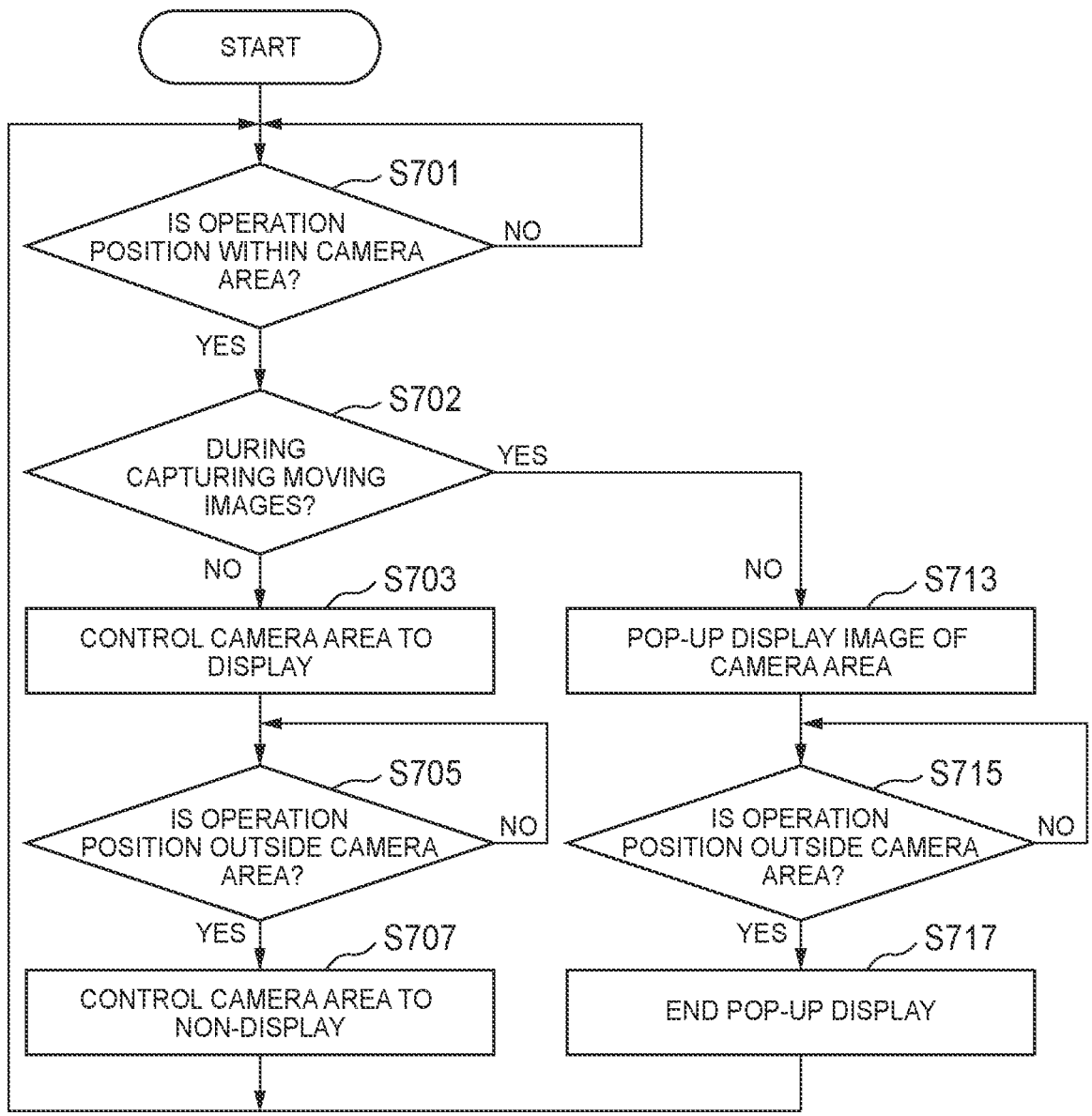
FIG. 14 is a flowchart illustrating a first example of the camera area display restoring process according to the fifth embodiment.

FIG. 14 is a flowchart illustrating a first example of the camera area display restoring process according to the present embodiment. In this process, the camera area non-display mode is a prerequisite. Thus, as illustrated in FIG. 1, the camera area display control unit 110 controls the camera area CA to be non-displayed.

(Step S701) The camera area display control unit 110 determines whether the user's operation position is within the camera area CA. When the camera area display control unit 110 determines that the user's operation position is within the camera area CA (YES), the process proceeds to step S702. When the camera area display control unit 110 determines that the user's operation position is not within the camera area CA (i.e., outside the camera area CA) (NO), the process performs step S701 again.

(Step S702) The camera area display control unit 110 determines whether the camera 15 is capturing moving images. For instance, the camera area display control unit 110 obtains information indicating the operating state of the camera 15 from the camera 15 to determine whether the camera 15 is capturing moving images.

When the camera area display control unit 110 determines at step S702 that the camera 15 is not capturing moving images (NO), the process proceeds to step S703 to perform the process corresponding to the first display restoring process. Subsequent steps S703, S705 and S707 are the same as steps S203, S205 and S207 in FIG. 8. That is, the camera area display control unit 110 controls the camera area CA to be displayed (step S703), and then, when the camera area display control unit 110 determines that the user's operation position is outside the camera area CA (step S705: YES), the camera area display control unit 110 controls the camera area CA to be non-displayed (step S707). Then, the process returns to step S701.

When the camera area display control unit 110 determines at step S702 that the camera 15 is capturing moving images (YES), the process proceeds to step S713 to perform the process corresponding to the second display restoring process. Subsequent steps S713, S715 and S717 are the same as steps S503, S505 and S507 in FIG. 8. That is, the camera area display control unit 110 controls to display the image based on the display data corresponding to the camera area CA on the pop-up screen (step S703), and after that, if it is determined that the user's operation position is outside the camera area CA (step S705: YES), the camera area display control unit 110 ends the display of the pop-up screen (step S707). Then, the process returns to step S701.

In addition to the case where the camera 15 is capturing moving images, the camera area display control unit 110 (display restoring processing section 113) may switch between the first and second display restoring processes based on whether the camera 15 is capturing image data to record still images (e.g., capturing still images using long time exposure).

The information processing apparatus in this embodiment may be configured to allow the user to instruct whether the first or second display restoring process is to be selected. For instance, the information processing apparatus 1 may provide the user with an operation user interface (UI) that allows the user to select either the first display restoring process or the second display restoring process, thus allowing the user to select between the first display restoring process and the second display restoring process. The camera area display control unit 110 (display restoring processing section 113) executes the first display restoring process when the user selects the first display restoring process, and executes the second display restoring process when the user selects the second display restoring process.

Figure 15:
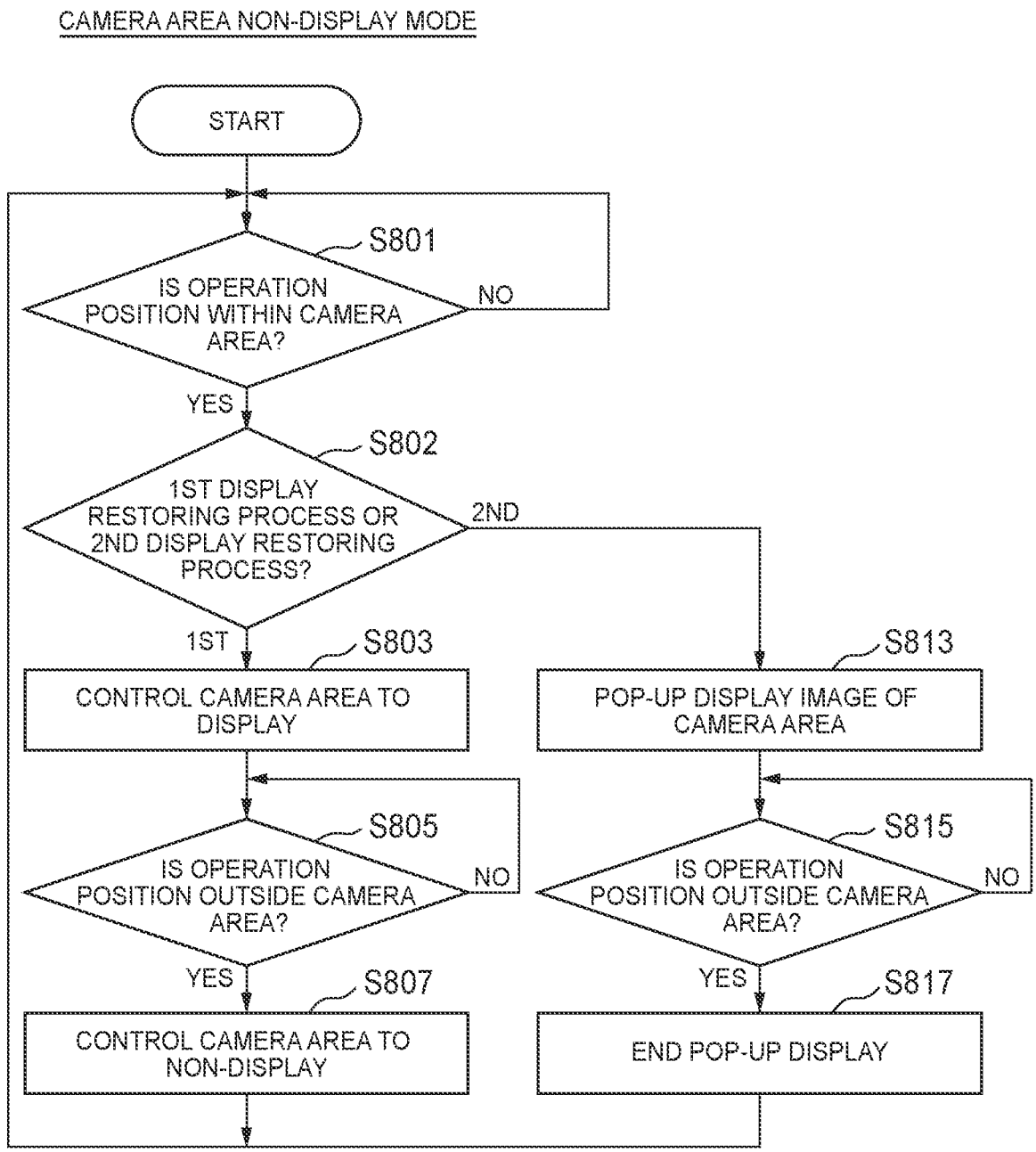
FIG. 15 is a flowchart illustrating a second example of the camera area display restoring process according to the fifth embodiment.

FIG. 15 is a flowchart illustrating a second example of the camera area display restoring process according to the present embodiment. In this process, the camera area non-display mode is a prerequisite. Thus, as illustrated in FIG. 1, the camera area display control unit 110 controls the camera area CA to be non-displayed.

(Step S801) The camera area display control unit 110 determines whether the user's operation position is within the camera area CA. When the camera area display control unit 110 determines that the user's operation position is within the camera area CA (YES), the process proceeds to step S802. When the camera area display control unit 110 determines that the user's operation position is not within the camera area CA (i.e., outside the camera area CA) (NO), the process performs step S801 again.

(Step S802) The camera area display control unit 110 determines whether the user has selected either the first display restoring process or the second display restoring process. When the camera area display control unit 110 determines that the user has selected the first display restoring process, the process proceeds to step S803 to perform the process corresponding to the first display restoring process. Subsequent steps S803, S805 and S807 are the same as steps S203, S205 and S207 in FIG. 8. That is, the camera area display control unit 110 controls the camera area CA to be displayed (step S803), and then, when the camera area display control unit 110 determines that the user's operation position is outside the camera area CA (step S805: YES), the camera area display control unit 110 controls the camera area CA to be non-displayed (step S807). Then, the process returns to step S801.

When the camera area display control unit 110 determines at step S802 that the user has selected the second display restoring process, the process proceeds to step S813 to perform the process corresponding to the second display restoring process. Subsequent steps S813, S815 and S817 are the same as steps S503, S505 and S507 in FIG. 8. That is, the camera area display control unit 110 controls to display the image based on the display data corresponding to the camera area CA on the pop-up screen (step S803), and after that, if it is determined that the user's operation position is outside the camera area CA (step S805: YES), the camera area display control unit 110 ends the display of the pop-up screen (step S807). Then, the process returns to step S801.

Summary Of The Fifth Embodiment

As described above, the information processing apparatus 1 according to the present embodiment is configured so that, when the user's operation position detected is within the camera area CA, the camera area display control unit 110 selectively switches between the first display restoring process, which displays an image based on the display data corresponding to the camera area CA while controlling the light emission of pixels in the camera area CA, and the second display restoring process, which displays an image based on the display data corresponding to the camera area CA in an area of the screen area DA of the display 14 other than the camera area CA.

This allows the information processing apparatus 1 to, when the user's operation position is within the camera area CA, switch between controlling the camera area CA from non-display to display and displaying an image based on the display data corresponding to the camera area CA outside the camera area CA, so that the information processing apparatus 1 is convenient.

For instance, the camera area display control unit 110 switches between the first and second display restoring processes depending on the operating state of the camera 15.

While the camera 15 is capturing moving images (or still images by long time exposure), for instance, this allows the information processing apparatus 1 to display an image based on the display data corresponding to the camera area CA outside the camera area CA when the user's operation position is within the camera area CA. This allows the user to operate the information processing apparatus while looking at the operation target, without interfering with the functions of the camera 15. When the camera 15 is not capturing moving images (or still images by long time exposure), the information processing apparatus 1 controls the camera area CA from non-display to display when the user's operation position is within the camera area CA, so that the user can intuitively perform operations while looking at the operation target.

The camera area display control unit 110 may switch between the first and second display restoring processes in response to user's instruction.

This allows the information processing apparatus 1 to control camera area CA from non-display to display, or display an image based on the display data corresponding to the camera area CA outside the camera area CA when the user's operation position is within the camera area CA, as the user wishes. Thus, the information processing apparatus 1 enables appropriate control of the display on the display 14.

The specific configuration of the present invention is not limited to the above-described embodiments, and also includes design modifications or the like within the scope of the present invention. For instance, the configurations described in the above embodiments can be combined freely.

The above-stated information processing apparatus 1 internally includes a computer system. A program to implement the functions of various configurations of the information processing apparatus 1 as stated above may be stored in a computer-readable recording medium, and the process at the various configurations of the information processing apparatus 1 may be performed by causing the computer system to read and execute the program stored in this recording medium. "Causing the computer system to read and execute the program stored in the recording medium" includes installing of such a program in the computer system. The "computer system" here includes an OS and hardware, such as peripherals. The "computer system" may include a plurality of computer devices connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium storing the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the information processing apparatus 1. Different distribution servers may distribute these divided pieces of program. The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions that the information processing apparatus 1 of the above-described embodiment has may be implemented as an integrated circuit, such as a LSI (Large Scale Integration). Each of the functions as stated above may be implemented as one processor, or a part or all of the functions may be implemented as one processor in an integrated manner. A technique for integrated circuit is not limited to a LSI, and an integrated circuit may be realized using a dedicated circuit or a general-purpose processor. If a technique for integrated circuit that replaces LSIs becomes available with the development of semiconductor techniques, an integrated circuit based on such a technique may be used.

The information processing apparatus 1 is not limited to a laptop PC, but may also be a desktop PC, tablet terminal device, smartphone, or other apparatuses.

DESCRIPTION OF SYMBOLS 1 information processing apparatus
10 system processing unit
11 communication unit
12 memory unit
13 USB connector
14 display
15 camera
20 EC
21 acceleration sensor
22 power button
30 input device
31 keyboard
32 touchpad
40 power supply
101 CPU
102 GPU
103 memory controller
104 I/O controller
105 system memory
110 camera area display control unit
111 operation position detection section
112 display stop processing section
113 display restoring processing section

What is claimed is:

1. An information processing apparatus comprising:
a display having a screen area with an array of a plurality of pixels;
a camera near a rear face of the display to capture an image based on light incident through the display;
a memory that temporarily stores display data to be displayed on the display; and
a processor that controls light emission of a plurality of pixels of the display based on the display data stored in the memory, thus causing the display to display an image based on the display data,
the processor being configured to perform:
display stop process to stop emission of light from pixels in a first area corresponding to a position in the screen area of the display where the camera is placed and control the pixels to be non-displayed;

operation position detection process to detect an operation position within the screen area of the display; and when the operation position detected by the operation position detection process is within the first area, a display restoring process to display an image based on the display data corresponding to the first area in any part of the screen area of the display.

2. The information processing apparatus according to claim 1, wherein the processor is configured to,
in the display stop process, when function of the camera runs, stop emission of light from the pixels in the first area and control the pixels to be non-displayed.

3. The information processing apparatus according to claim 1, wherein the processor is configured to,
in the display restoring process, when the operation position detected by the operation position detection process is within the first area, control emission of light from the pixels in the first area to display an image based on the display data corresponding to the first area.

4. The information processing apparatus according to claim 3, wherein the processor is configured to, depending on an operating state of the camera, prohibit execution of the display restoring process.

5. The information processing apparatus according to claim 3, wherein the processor is configured to
in the display restoring process, control emission of light from the pixels in the first area to display an image based on the display data corresponding to the first area so as to display with a reduced amount of light emitted from the pixels in the first area, depending on an operating state of the camera.

6. The information processing apparatus according to claim 3, wherein the processor is configured to permit or prohibit execution of the display restoring process according to user's instruction.

7. The information processing apparatus according to claim 1, wherein the processor is configured to
in the display restoring process, when the operation position detected by the operation position detection process is within the first area, display an image based on the display data corresponding to the first area in an area other than the first area in the screen area of the display.

8. The information processing apparatus according to claim 1, wherein the processor is configured to
in the display restoring process, display an image based on the display data corresponding to the first area in an area other than the first area in the screen area of the display while enlarging the image.

9. The information processing apparatus according to claim 8, wherein the processor is configured to permit or prohibit execution of the display restoring process according to user's instruction.

10. The information processing apparatus according to claim 1, wherein the processor is configured to
in the display restoring process, when the operation position detected by the operation position detection process is within the first area, selectively switch between a first display restoring process, which displays an image based on the display data corresponding to the first area while controlling light emission of pixels in the first area, and a second display restoring process, which displays an image based on the display data corresponding to the first area in an area of the screen area of the display other than the first area.

11. The information processing apparatus according to claim 10, wherein the processor is configured to switch between the first and second display restoring processes according to an operating state of the camera.

12. The information processing apparatus according to claim 10, wherein the processor is configured to switch between the first and second display restoring processes according to user's instruction.

13. A control method of an information processing apparatus including: a display having a screen area with an array of a plurality of pixels; a camera near a rear face of the display to capture an image based on light incident through the display; a memory that temporarily stores display data to be displayed on the display; and a processor that controls light emission of a plurality of pixels of the display based on the display data stored in the memory, thus causing the display to display an image based on the display data,
the processor
stopping emission of light from pixels in a first area corresponding to a position in the screen area of the display where the camera is placed and control the pixels to be non-displayed;
detecting an operation position within the screen area of the display; and
when the operation position detected is within the first area, displaying an image based on the display data corresponding to the first area in any part of the screen area of the display.

\* \* \* \* \*